INVENTOR
John P. Tarbox
BY Richard E. Babcock Jr.
ATTORNEY

May 21, 1957 J. P. TARBOX 2,792,776
WIRE TYING MECHANISM

Filed June 22, 1955 6 Sheets-Sheet 2

INVENTOR
John P. Tarbox
BY Richard E. Babcock Jr.
ATTORNEY

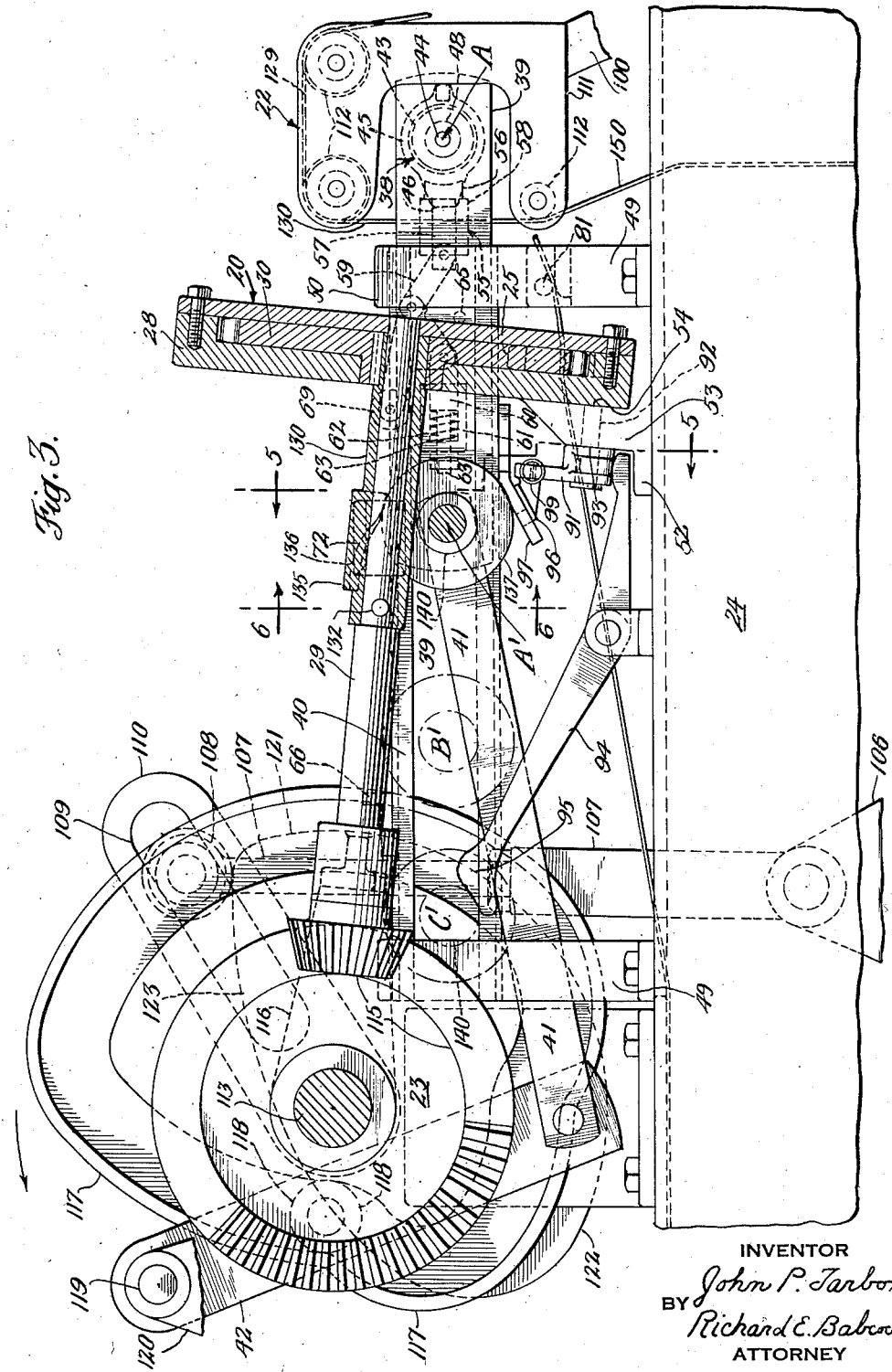

May 21, 1957 J. P. TARBOX 2,792,776
WIRE TYING MECHANISM
Filed June 22, 1955 6 Sheets-Sheet 4
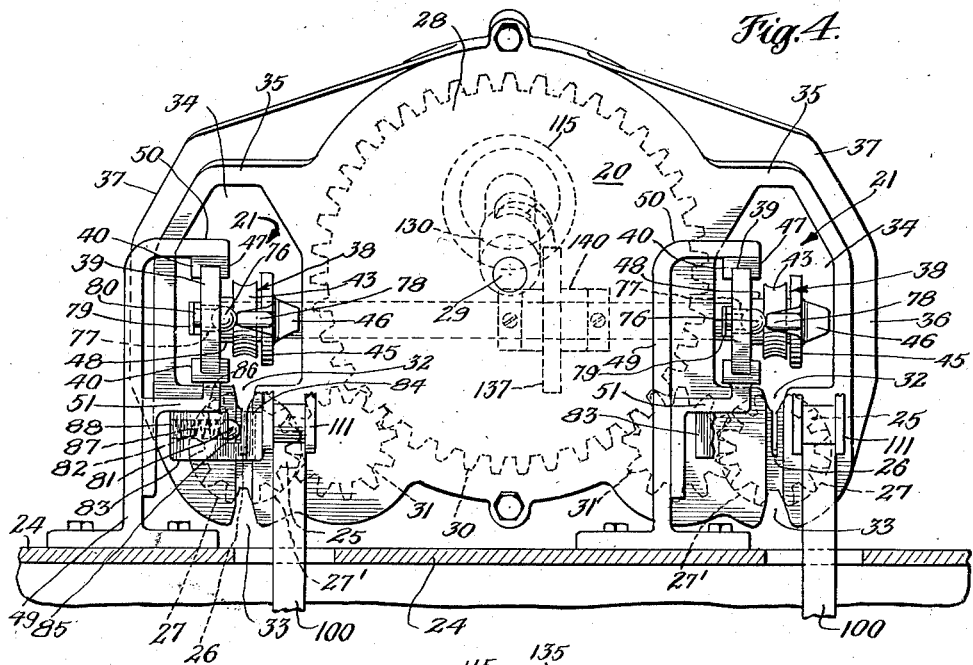
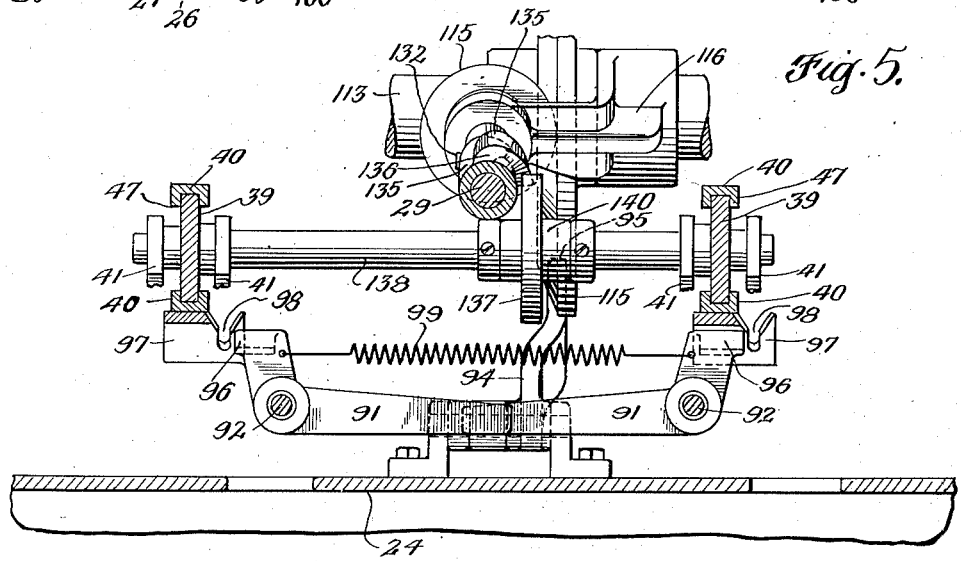
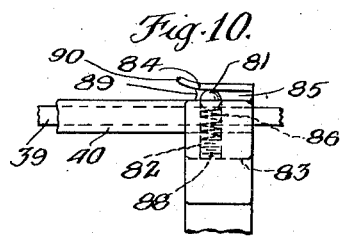
INVENTOR
John P. Tarbox
BY Richard E. Babcock Jr.
ATTORNEY

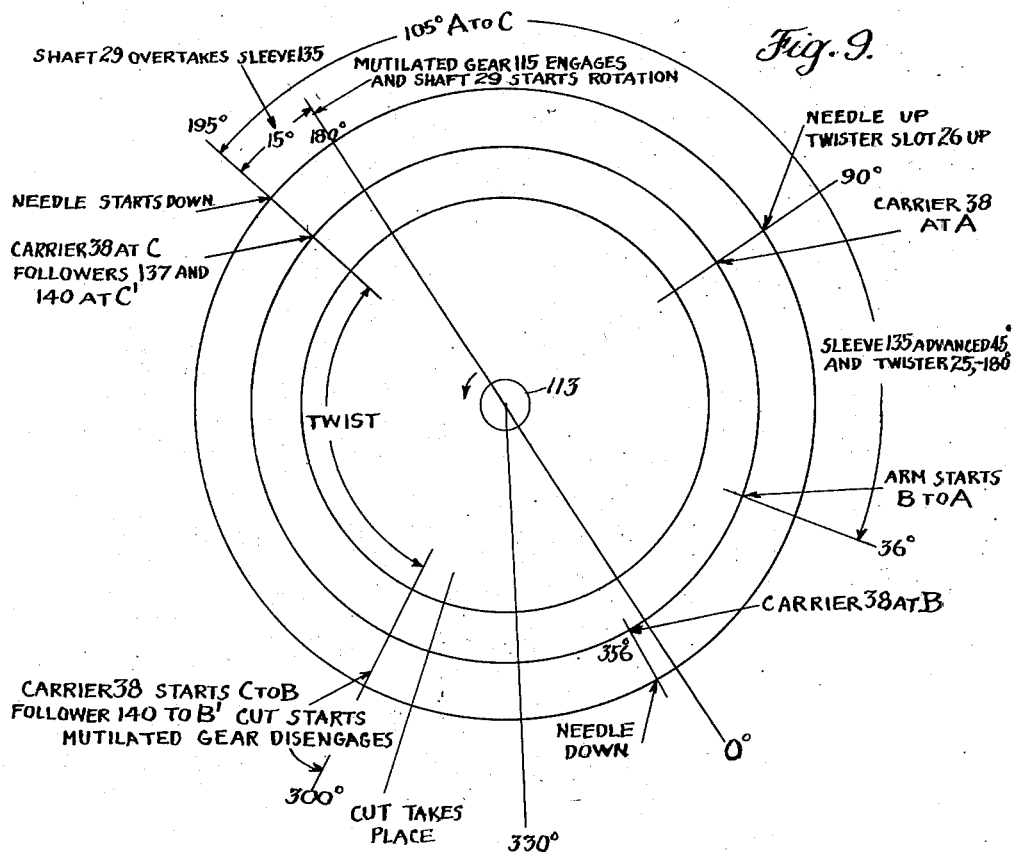
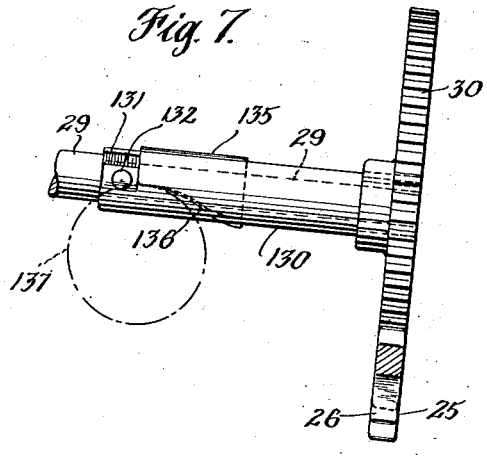
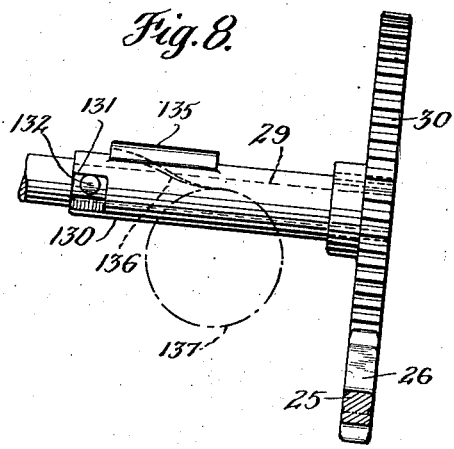

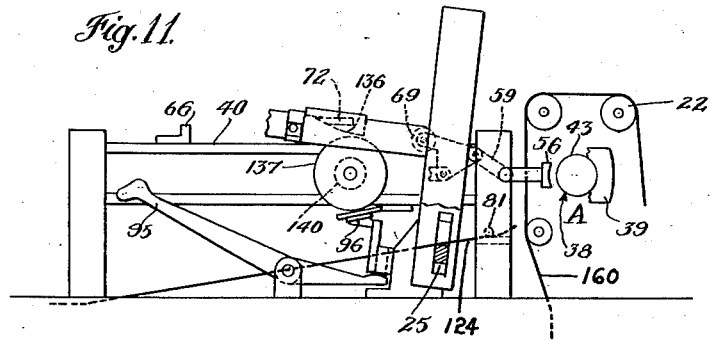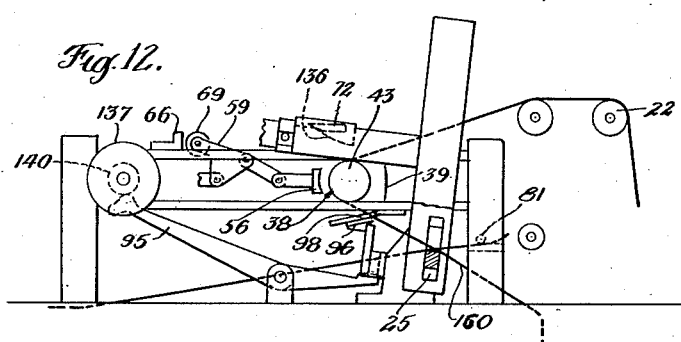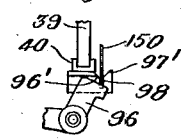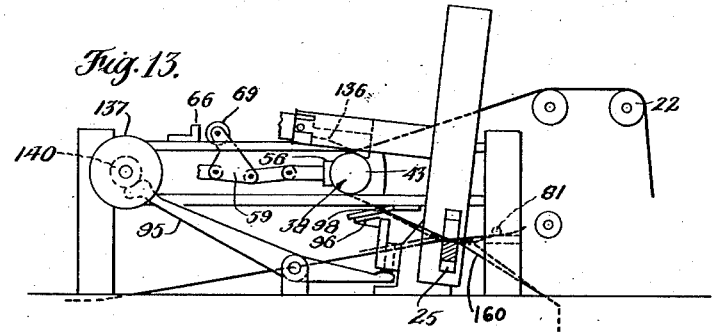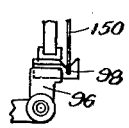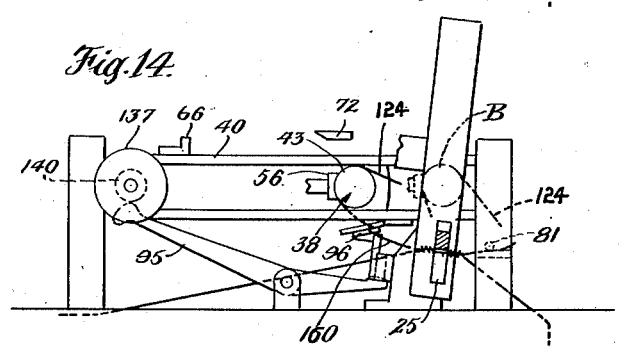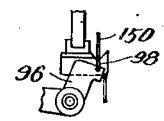

United States Patent Office 2,792,776
Patented May 21, 1957

2,792,776

WIRE TYING MECHANISM

John P. Tarbox, Philadelphia, Pa., assignor, by mesne assignments, to Sperry Rand Corporation, New Holland, Pa., a corporation of Delaware Application June 22, 1955, Serial No. 517,323

7 Claims. (Cl. 100—23)

This invention relates to improvements upon the wire tying mechanism, the subject of pending application Serial No. 423,428, filed April 15, 1954, in the name of George B. Hill.

One improvement has to do with the accuracy and certainty of the laying of the side of the wire loops in the twister along side the previously laid free end entering the tie. Another is the achievement of the severing of the free end from the laid side by means independent of improvement in the overall timing of the several operations of tying. Together, these improvements improve efficiency by the automatic advance rotation of the twister from its normal position of rest (in which normal position the free end strand is laid) through part of a revolution to a new position of rest (in which new position the side of the wire loop is laid) whereby the lay of the loop side like the free end is made in twister rest time instead of the twister rotation time.

Improvement in overall timing is achieved during the initial partial revolution of the twister from a portion of the reciprocating strand laying movements instead of from the main twister drive. Achieving the severing of the free end from the loop also from a portion of the reciprocating strand laying movements augments the improvement in timing. This divorcing of advance movement of the twister and strand severing from the main twister drive coupled with the advanced rest position of the twister results in marked improvement in efficiency—an efficiency the more marked because ties can now be made not only with greater certainty, but also at greater speeds of operation.

The more specific details of my invention are depicted in the drawings to which the following description applies.

Figure 3 is an enlarged longitudinal section on the line 3—3 of Figure 2. The parts are in the positions they occupy in the 90° positions of Figure 9.

Figure 4 is a front face view of the tying device per se as viewed looking toward the left in Figure 3, showing the needle points in the loop presenting position but broken away at the loop to show the twisters clearly.

Figure 5 is a cross section on the lines 5—5 of Figure 3.

Figure 7 is a fragmentary and somewhat schematic view of the twister gear and the associated device for rotating it, but part of a revolution, the gear being shown in its normal position of rest between ties.

Figure 8 is a view similar to Figure 7, but showing the twister gear rotated to a new position of rest.

Figure 9 is a diagram of an applicable timing cycle.

Figure 10 is a detail of the bale case clamp for the free end.

Figures 11, 12, 12a, 13, 13a, 14 and 14a are diagrammatic views illustrating inside elevations and associated cutter front elevations, various positions of the parts during a tying cycle, with particular reference to strand laying and cutting.

In describing the mechanism in detail, use will be made of the same numerals used in application Serial No. 423,428 so far as applicable, but additional numerals will be applied to the altered parts and to added parts.

Figure 1:
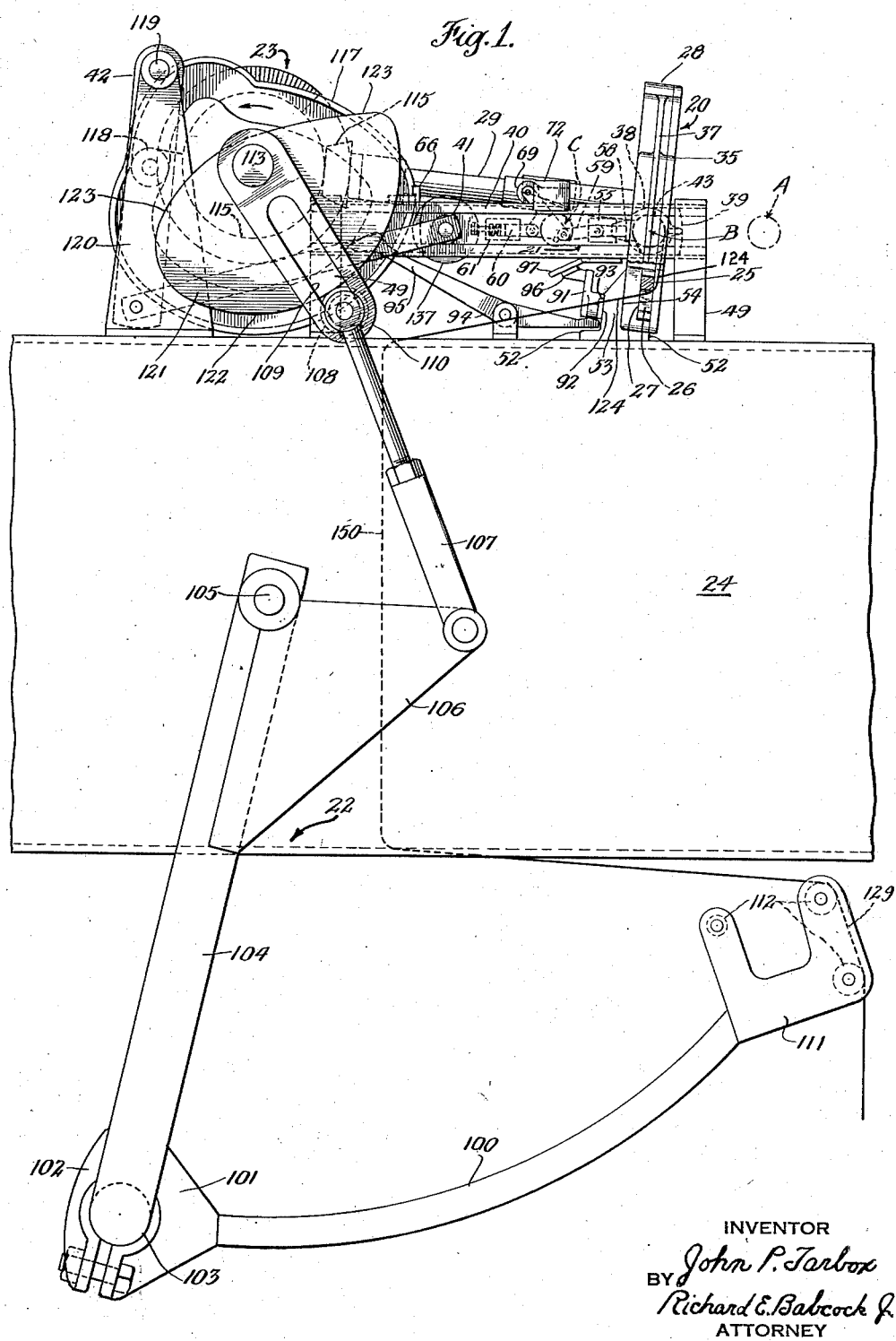
Figure 1 is a side elevation with the tying mechanism at rest and indicating in dotted lines a bale being formed. The parts are in the positions they occupy at 0°, Figure 9.
Figure 2:
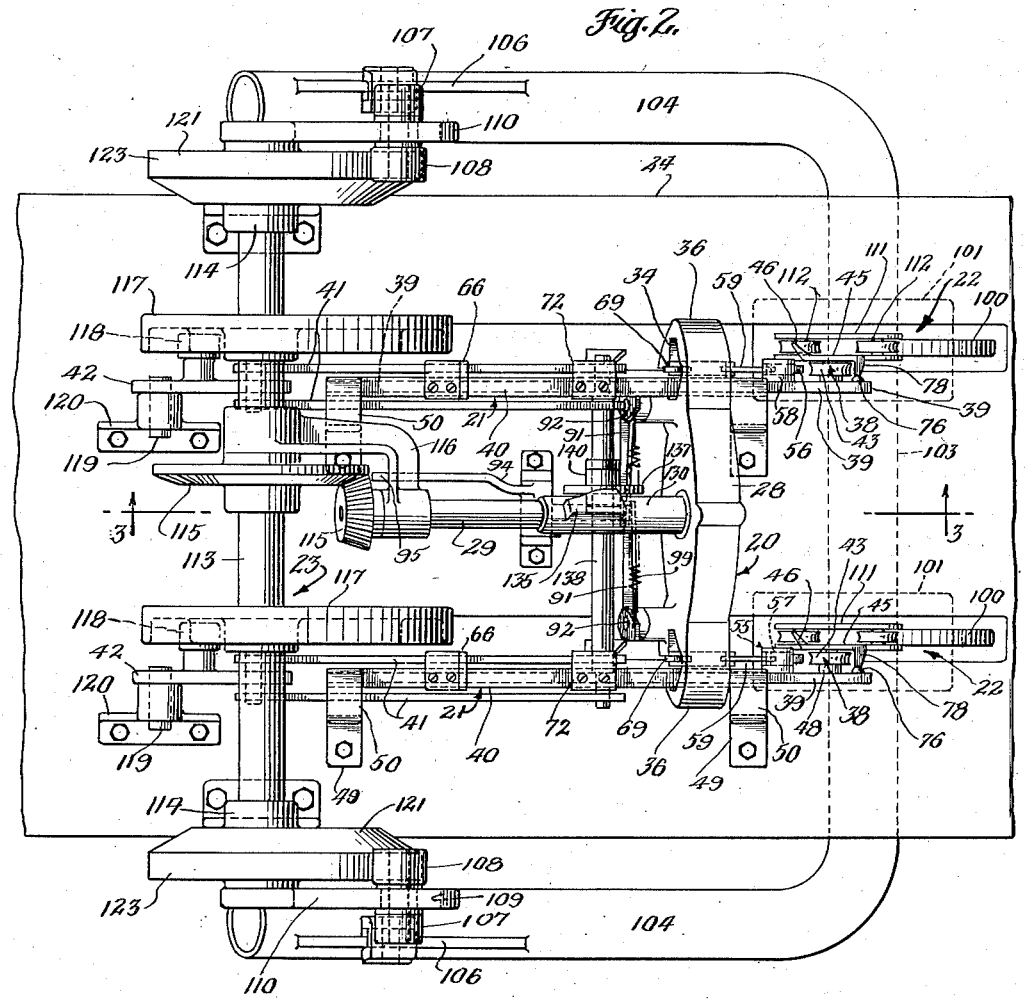
Figure 2 is a plan view but with the parts shown in the positions of Figure 3.
Figure 6:
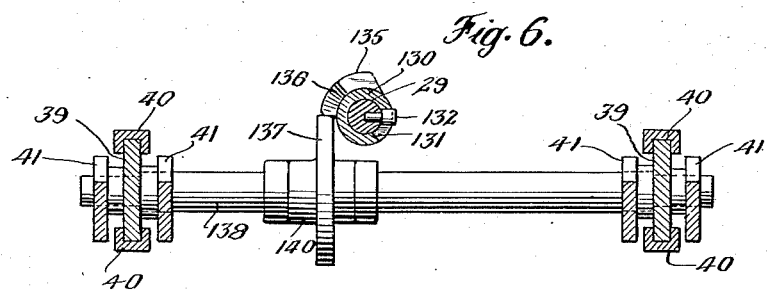
Figure 6 is a cross section on the line 6—6 of Figure 3.

Referring now to Figures 1 and 2, which are the most general views, it will be seen that the wire tying device 20, the wire laying devices 21, the needle mechanism 22, and a primary timing mechanism in the form of a common actuating shaft 23 are all mounted upon the outer faces of the bale case 24. Wire tying device 20, and wire laying devices 21 are arranged in close association with the timing mechanism 23 on the top of the bale case, while the needle mechanism 22 is supported as usual from opposite side walls of the bale case. As clearly appears in the plan view of Figure 2, the wire laying device 21 is provided in duplicate and the associated wire tying device 20 is provided with duplicate wire twisting gears (hereinafter to be referred to in detail), the former independently actuated from the timing mechanism 23. Thus it is that provision is made for making two wire ties around a bale equally distant from the vertical plane of symmetry of the bale. Inasmuch as the devices, mechanisms, and parts thereof having to do with each of the ties about a bale are constructed similarly throughout, a description of but one train of them will suffice for a description of both, and the reference numerals will be duplicated sufficiently to make the application to both of them clear, especially in Figure 2.

The wire tying mechanism

This mechanism, which appears in outline in Figures 1 and 2 and in various sectional drawings in Figures 3, 4, 7, and 8, is shown in front face elevation in Figure 4. Its key elements are the wire twisting gears 25 which are provided with wire receiving slots 26 of a width but slightly greater than the diameter of the wire which they are to tie, and which, when the two strands of wire to be interconnected, are laid in the slot near the axis of the gears, can be rotated several times to accomplish the necessary twist to constitute the wire tie.

The gears 25 are journaled for rotation in journal bearings 27 formed in a gear housing 28, within which they are driven from a power shaft 29 by means of a power gear 30 and the intermediary of idler pinions 31 in the well understood manner.

As appears very clearly in Figure 4, the outer halves of the journal 27 for the gears 25 are divided in the vertical planes from the inner halves 27' of these journals, by upper and lower slots 32 and 33, respectively, which slots are longitudinally through running from one face of the housing 28 to the other, from the front face to the rear face. Moreover, the upper slots 32 communicate with large openings 34 in the housing, which openings likewise extend from front face to rear face, and through which the wire laying devices 21 operate. The heads of these wire laying devices appear clearly in Figure 4. The outer halves of the journals 27 connect with the main body of the casing 28 only through integral housing shoulders 35 and depending arms 36. They are thus supported cantilever fashion from the upper portion of the housing 28. These arms 36 have an extended downward reach from the upper portions of the housing 28 and to give them strength, a deep laterally projecting ribbing 37 is provided on their outer surfaces and is extended over the tops of the shoulders to the top of the housing.

Slots 32 and 33 are considerably wider than the diameter of the wire to be laid and tied. Normally, slots 26 are opened downwardly in alignment with the centers of the lower slots 33 of the housing. Thus, the free end strand of a wire tie can be drawn by a bale as it is built up and laid by this drawing action in the twister 25. When the twister 25 is rotated through 180 degrees to register with the upper slot 32, the associated wire laying device 21 which operates in the same vertical plane as the slots, may lay a bale strand in slot 26 by way of slot 32 in the housing.

The wire laying device

Each wire laying device comprises a wire carrier 38 on the forward end of a horizontally arranged reciprocating bar 39 which is borne in channel guides 40 substantially parallel to the bale case and reciprocated therein by links 41 connecting with the depending cam lever 42 of the primary timing mechanism 23. The carrier 38 comprises a roller 43 which is journaled upon a pintle 44 projected laterally from bar 39 and bearing on its inner end a head 45 of a diameter somewhat greater than the maximum diameter of the roller 43, which head is provided on its rearward side with a forwardly and laterally extending wire deflector or projection 46. The roller 38 is properly grooved to receive and guide the wire which it may engage for the making of a lay. The deflector 46 is tapering in shape from its base on the head 45 and somewhat pointed, but outstandingly; its forward face is tapered or inclined gradually toward and merges into the periphery of the head 45. The head 45, in its turn, has the inner face of its periphery merged smoothly into the curvature of the surface of the roller 38, whereby a wire hooked on the forward side of the projection 46 is slid smoothly in toward the roller and over the periphery of the head 45 into the groove of the roller. An enlarged shank 48 on the pintle 44 or a washer equivalent spaces roller 38 sufficiently from the adjacent face of bar 39 to enable the roller adequately to clear the side walls 47 of the channels 40 in its reciprocation.

The guide channels 40 are supported from the bale case 24 in an elevated position by a pair of spaced pedestal members 49, the one immediately in front of the wire tying mechanism 20 and the other a considerable distance to the rear thereof. These members are bolted by their bases to the top of the bale case as can be clearly seen in Figure 4. Their upper ends are turned over at right agles as at 50 and the upper channel guides 40 are secured to the under sides of the turned portions. Welded to the lower faces are Z-shaped extensions 51 which support on the ends of their upwardly extending arms the lower of the two channel guides 40.

The wire tying device 20 is also supported directly from the top of the bale case 24, but by means independent of the pedestals 49 and the guides 40. This support consists of a special pedestal 52 having an upward extension 53 which makes an acute angle forwardly with the top of the bale case and the corresponding acute angle forwardly with the guides 40 and the line of reciprocation of the wire laying device 21. The housing 28 of the wire tying device 20 is secured to the machined rear face 54 of the acute angled upward extension 53 in such manner that the planes of symmetry of its gears makes the same acute angle respectively with the bale case top and the line of reciprocation of the wire laying device.

Wire holding devices

There are associated with the wire laying device 21 three different wire holding devices, two of them associated directly with the wire carrier 38 and a third associated indirectly with it. First, there is the clamp type holder 55 (see Figures 1 to 3, especially Figure 3). This comprises a clamping head 56 having a curved front face adapted to clamp a bale strand engaged by the carrier 38 between its rear face and the curved periphery of the roller 43. The head 56 is borne on the end of a short sliding bar 57 of relatively small size mounted for longitudinal reciprocation in a block 58 secured to the face of slide 39 which mounts the carrier 38. Reciprocation of the clamping head 56 into and out of wire clamping position is brought about by an overthrow toggle 59 which extends between the front end of the mounting bar 57 and the rear end of a short slide bar 60 guided in a mounting block 61 also secured to the face of slide 39 in a forward position. The toggle 59 is spring-pressed in its "off" and "on" positions by a spring 62 confined on the shank 63 of slide 60 which is of reduced diameter or size, and exerting its pressure between the main body of the slide 60 and the closed end of the block 61, the degree of throw being adjustably limited by a pair of jam nuts threaded onto the end of the reduced shank 63 which end is projected outside the closed end of the block 61. This adjustment defines the "off" position of the toggle 59. The "on" position is defined by the engagement of the under side of one branch of the toggle with a pin 65 projected from the face of the slide 39 of the wire laying device 21. Perhaps this should be defined as the extreme "on" position, for it is the intention to have the spring 62 press the clamp head 56 yieldingly firmly yet not immovably against the body of the wire strand about the roller 38. The pin is simply intended to limit the amount of over-center throw when the toggle is set in the "on" position.

Operation of the toggle 59 from the "off" position of clamp 56 which is depicted in Figure 3 to the "on" position which is depicted in Figure 1, is achieved through the engagement of a follower roller 69 attached to an upward extension of its forward arm with a stop plate 66 carried from the upper guide 41 of the wire laying device 21. Operation in the reverse direction to again place the clamp 56 in the "off" position shown in Figure 4 is achieved by engagement of the roller 69 during movement of device 21 with a stop plate 72 also supported from the upper guide 41. Stop 66 engages roller 69 when the wire laying device 21 is substantially at the extreme of its forward stroke. When the roller 69 strikes the stop 72, the roller is forced downwardly to open the toggle and then passes under the stop plate 72.

The second and third of the holding devices appear in Figures 2 and 4. The second of them will be seen to consist of a ball 76 located in a through running aperture 77 in the rear end of slide 39 of the wire laying device 21 and borne yieldingly against the projection 78 from the under side of the head 45 of the carrier 38 by means of a flat spring 79 secured to the side face of slide 39, and bearing against the ball 76 through a spring carried stud 80. The relative dimensions and arrangement of the parts is such that the projection 78 and the ball 76 contact each other a slight distance away from the adjacent faces of the guides 40 and in such position that a wire strand entering from the rear between the surface of the ball and the rear rounded surface of the projection 78 will slip between them and lodge in the groove of the roller 43 of the carrier 38. This wire holding device like the toggle operated clamping head 56 is directly associated with the carrier 38.

The third holding device, a bale case clamp for the free end, is indirectly so associated. As clearly appears on the left of Figure 4 and in Fig. 10, it consists of a ball 81 in the bore or slot 82 of a block 83 secured to the under side of the horizontal main branch of the Z-shaped bracket 51 which supports the lower guide 40 and adapted to be borne against the inner face of an upwardly extending flange 84 on the overhanging margin of block 83. The bore 82 opens upon an upwardly presenting slot 85 lying between the adjacent face of the guide 40 and the upwardly projecting flange 84 of the block 83. Ball 81 is yieldingly borne against the inner face of the flange 84 by means of a spring 86 confined in the bore by a cap screw 88. The forward end of slot 85 is downwardly chamfered as at 89 and the forward end of the flange 84 is flared outwardly of the slot as at 90. This holding device is attached to the forward pedestal 49 between the wire tying device and the adjacent path of movement of the head 111 of the needle of mechanism 22. Slot 85 lies in the same vertical plane substantially as the point of engagement of the ball 76 and projection 78, while the flared end 90 of flange 84 is transected by the central vertical plane of roller 43 of the carrier 38. As a result, it is feasible for the carrier 38 to place a wire strand which it carries first in contact with the flange 90 and then to carry it between the inner face of flange 84 and the ball 81 to a position rearwardly of the ball in which position it is yieldingly held. The vertical elevation of this third holding device as attached to the rear pedestal 49 is below the path of travel of the lower portion of the wire laying device 21 as clearly appears in Figure 4, yet it has sufficient elevation to give ample angular spread vertically between a free end strand which it may hold and an associated bale strand to which the free end is to be tied. Any other known form of free end clamp may be used in lieu of this.

The cutting mechanism

The cutting mechanism shown in Figure 5 in elevation appears in plan view in Figure 2 and in side elevation in Figures 1 and 3. It consists on each side of a cutting lever 91 fixedly pivoted at 92 to the forward face 93 (see Figure 1) of pedestal block 52 which supports the wire tying mechanism 20, the plane of face 93 being parallel to the rear face 54 to which the wire tying mechanism 20 is secured. Levers 91 thus lie in plane parallel to the transverse inclined plane of the wire tying device 20 and operate in these planes. The cutting edges 96 borne by the levers are, however, not in the same plane as the levers, but are offset at an acute angle to occupy a plane extending downwardly and forwardly to contact the similarly extending plane under faces of anvil members 97 secured by welding to the under faces of the lower guides 40. The overhanging portions of the rearwardly and downwardly extending anvils are vertically slotted to receive a wire lay to be cut, and the upper edges of the slot are flared widely outwardly the more certainly to guide the wire into the narrow portion of the slot 98. Cutting edges 96 coact with the edges of the narrow portions of the slots 98 as usual to provide the shearing action for the cutting of the wire. Figures 4 and 5 are drawn to the same scale and the axes and planes of corresponding parts are vertically superimposed. From this it will be apparent that the slots 98 lie in the same vertical plane as do gear slots 26 of the twister gears 25 and the pulleys 43 of the grippers 38. The result of this is that a bale strand borne from the under side of a gripper 38 on its forward stroke will be laid in one of the cutting slots 98 of the cutting mechanism following its laying in the wire twisting slots 26 of the associated twister gear 25 when the gripper 38 moves forwardly. A cutter retracting spring 99 inter-connects the top levers 91 and actuates them on their return stroke. Actuation of the forward stroke is by means presently to be described.

The needle mechanism

The needle mechanism at large appears principally in Figure 1, though the heads of the two needles used appear in Figure 2 in plan, while the head of one needle appears in Figure 3 in the position which it occupies at the extremity of its stroke above the top of the bale case. With the understanding that there are two needles 100 used, a description of what appears in these several views will be sufficient without further showing. The needles 100 consist of main bodies, the bases 101 of which are bolted adjustably through yokes 102 about the bight 103 of the usual U-shaped yoke 104, the extremities of the arms of which are respectively oscillably mounted on studs 105 secured to the side walls of the bale case 24. Rearwardly extending triangular brackets 106 welded to the arms 104 connect through longitudinally adjustable links 107 with a needle actuating cam follower 108 borne slideably in slot 109 of needle actuating crank arm 110 of the primary timing mechanism 23. The body of the needle 100 is arc-shaped on a radius centered on the studs 105 of the yoke 104. The heads of the needles are comprised of a U-shaped double walled sheet metal frame 111, the opening between the arms of which extends upwardly and forwardly in such relation to the body of the needles as to occupy a substantially horizontal position when the needle is at its upper extremity of movement and the head 111 is immediately opposite the wire laying device 21. Head 111 is secured to the body of the needle at its rear lower corner. At the extremity of each arm and at the rear upper corner of the U are located wire engaging rollers 112 carried on pintles between the walls of the sheet metal structure. These rollers are located in right angular relation to each other as clearly appears in several of the views, the arrangement being such that a wire loop carried through the casing by the needles has a bight portion 129 extending substantially horizontally from roller to roller of the upper of the U arms, and a vertical bale strand portion 130 extending vertically from the roller on the upper arm past the roller on the lower arm. The vertical plane of the rollers in this case transects the laterally and forwardly extending wire deflector or projection 46 of the carrier 38. Thus, the carrier 38, when reciprocated rearwardly to the position shown in Figure 3, slips the projection 46 past the vertically extended portion of the bale loop, and on its forward stroke hooks that portion of the needle loop over into the groove of its roller 43 and carries it forwardly in its wire laying operation.

The timing mechanism

The timing mechanism 23 provides the power for actuating the various mechanisms and devices already described and the means for relatively timing them with accuracy. Referring especially to Figures 1 and 2, this mechanism comprises a timing shaft 113 which, according to the invention, is characterized by its being driven by any means desired through but one revolution at a time, being started at the beginning of the revolution and stopped at the completion. One-revolution and stop clutches are commonly used in the art for this purpose and are commonly controlled in their starting from bale metering wheels. They are stopped by their own mechanism. The constructions are so common that it is not deemed necessary to show it in this connection. Shaft 113 may be supported from the top of the bale case 24 through any suitable pedestal bearings such as 114 associated with cam 121.

Wire tying device 20 is driven from this shaft through its own power shaft 29 which makes connection with shaft 113 through beveled gears 115. Angled bearing bracket 116 commonly journals both shafts in such a manner as to give the respective axes position in a common plane. Bevel gears 115 are of the intermittent type, that is to say, gear 115 on shaft 113 is provided with teeth on but a portion of its periphery as indicated, whereby to drive the small gear 115 on shaft 29 by a portion of the revolution of shaft 113, whereupon shaft 29 comes to rest. This is a well-known type of gear and its details need not be shown. Shaft 29 is, of course, locked in its rest position against rotation by other means than the gear 115.

Wire laying devices 21 are operated from shaft 113 by the engagement of the slotted cams 117 fixed on shaft 113, with the follower rollers 118 borne by the oscillating cam levers 42 which have already been described as connected by means of links 41 with the slides 39 of the wire laying devices 21. Links 42 are suspended by their pivots 119 from the upper ends of pedestals 120 which rise from the top of the bale case. Note that links 41 are dual while cam levers 42 are single and slides 39 are single, the links 41 flanking them and being connected with them through pivots. Note also that pivot 119 is offset on one side of the levers 42 while the followers 118 are offset on the opposite side.

The needle mechanism 22 is driven from the opposite ends of the shaft 113 by means of the slotted arms 110 which are keyed to the opposite ends of the shaft 113. In this drive, the followers 108 are moved about the periphery of fixed cams 121 emanating from the periphery of the bearing pedestals 114. The outermost portions 122 of this periphery are arcuate about the center of shaft 113 and the length of slot 109 is such that the follower 108 is supported against this arcuate periphery during the traverse of the arm 110 through its angular extent in the direction of the arrow. When, however, the arm 110 leaves the arcuate portion, cam follower 108 is borne by gravity onto the upper and less remote portion 123 of the periphery of the cam and recedes in slot 109 radially downwardly and inwardly toward the axis of shaft 113 until it nears the radially innermost portion of the slot 109 whereupon it again passes radially outwardly along the slot until it once again travels the arcuate periphery.

By providing one of these cam drives for the needle mechanism on each end of the shaft 113 symmetrical application of power to opposite ends of the yoke 104 and freedom of the yoke from twisting is attained.

Twister advance and cutter drive

The twister advance and cutter drive is from the strand laying mechanisms 21 (refer to Figures 2, 3, 6, 7, and 8). The shaft 29, instead of being directly connected with twister drive gear 30, is indirectly connected therewith through a lost motion connection with directly connected gear driving sleeve 130 keyed to gear 30 as clearly appears in Figure 3. The lost motion connection between sleeve 130 and shaft 29 comprises a rectangular slot 131 in the forward end of the sleeve and a slot encompassed pin 132 in shaft 29. The degree of lost motion between the pin and the flanking slot sides is such as will admit of a partial revolution of the twisters without movement of the main drive shaft 29. In this case, the degree of lost motion is 45° and the admitted partial revolution of the twister, 180°. The partial revolution is accomplished by a partial revolution of the sleeve 130.

On sleeve 130 is an enlargement 135 having a radially extending axially inclined downwardly presenting cam face 136. An axially reciprocable cam follower 137 in a vertical plane engages the cam face. Follower 137 is in the form of a relatively large diametered roller having bearings on transverse shaft or rod 138 which is jointly borne and reciprocated by the two slides of the strand laying mechanism. For economy of parts, the opposite ends of shaft 138 serve also as means of pivotal connection of links 41 with slides 39. The angular relationships of the driving train from mutilated gears 115 through to the twister gears is as follows:

When the gears 115 stop, driving pin 132 is contacting the forward wall of slot 131 and twister gear slots 26 open downwardly (see Figure 7). When cam follower 137 completes its engagement with cam face 136 on the needle stroke of the strand laying mechanism, twister gear slots open upwardly and pin 132 lies adjacent the rearward wall (see Figure 8).

The cutter drive is cam follower 140. This follower is considerably smaller in diameter than the follower 137, but erected alongside of it on the same shaft 138. The end of cutter actuating lever 94 is located in the same vertical plane as cam follower 140. Its rear end 95 is cam-shaped by giving it curvilinear and angular deflection downwardly from an extreme upward position in which it is engageable by follower 140 as it approaches the rearward extremity of its strand laying stroke. So engaged by follower 140, the lever 94 will be oscillated counterclockwise, causing its forward underlying end to lift cutter levers 91 and accomplish the cut. When follower 140 leaves lever end 95, spring 99 retracts levers 91. As shown, the cutters will be actuated on both reciprocations of follower 140. They will be effective to cut on but the forward reciprocation, for the position of end 95 of the cutter lever 94 is such that on the backward reciprocation it is engaged before the strand being laid reaches cutter blades 96, 97, so closing cutter slot 98 against strand entrance.

Operation

Coming now to the overall operation of the tying mechanism, it is believed that this can be clearly followed from the several figures of the drawings which show in full and dotted lines successive operational positions of the various elements of the mechanism during a tying cycle, as supplemented by the timing diagram of Figure 9 and the lay and cutting diagrams of Figures 11 to 14a. Figure 9 diagrammatically delineates one time cycle of the operations and indicates the relative positions of the various major elements of the mechanisms at successive rotational positions of their common control or actuating shaft 113.

Figure 1 shows the several parts in the positions which they occupy following completion of a bale and just prior to initiation of the tying cycle, the actuating shaft 113 at this time being in its position of rest at 0 degrees on the diagram in Figure 9. At this time, the free end 124 of wire will have been laid into twister 25 from thereneath by pressure of the forwardly moving bale end 150. As soon as the shaft 113 commences to rotate in the direction indicated by the arrow in Figures 1 and 9 to initiate the tying cycle, the ensuing movement of the follower roller 108 over the fixed cam surface 122 as caused by the rotating crank arms 109 acts through the links 107 and yoke 104 to commence upward swinging movement of the needles 100. At the same time, the coaction between the cams 117, followers 118, arms 42, and links 41 institutes movement of the wire carriers 38 from their positions B of Figure 1 toward the position A of Figures 2, 3, and 11. At the inception of such movement, it will be seen that coaction between the roller 69 on toggle arm 59 and the abutment 72 will swing the toggle arm 59 to release or retract clamp 56 from the roller 43, to thus release the free end of wire held between these elements as shown in Figure 3. Also, incident to this same movement, the free end will have been caught beneath the ball detent 81 to be thereby held out of the path of the carrier 38 during its subsequent movement. When in position A, the carrier 38 is at the extremity of its reciprocating movement in the one direction (needle stroke) and about to commence its return movement (strand laying stroke). By reference to Figure 9, it will be seen that the needle 22 will have reached the position of Figure 11 at the end of 90° revolutions of the shaft 113 to await the subsequent arrival of the carrier 38 to the position of Figure 11 in readiness to pick up the wire from the needle 100.

Also at the inception of the movement of carriers 38 from their B positions, slides 39 will move cam follower 137 into engagement with cam face 136 (Figures 3, 7, 8, and 11), and while carriers 38 are on their way to pick up the needle strand, gears 30 will be rotated 15° and twisters 25 will be rotated 180° in advance, to now present their strand receiving slots and the already laid free ends 124 upwardly and in a position of rest, ready to receive the needle strands. The lost motion connection at 131, 132 admits of this.

At the same time the needle arrives at position A in Figure 11, the cam follower or roller 108 will have commenced to ride over the cam surfaces 123 (see Figure 3) to thereby let the needle dwell in substantially this position during the immediately ensuing portion of the tying cycle. The cam 117 then acts to retract the carrier 38 to lay the lower strand 160 of the wire in the upwardly presenting slot 26 of the now resting twister 25, as shown in Figure 12, for the follower 137 does not engage cam 136 on the retraction stroke. As the lay in twister 25 is about complete and as carrier 38 nears the end of its retraction stroke (Figures 12 and 12a), strand 160 is also laid at the month of slot 98 of the cutter, but it does not enter the slot because the cutter blades 96, at this juncture, close the slot 98 by reason of the retracting engagement of follower 140 with cutter lever 95 (see Figure 12a). Strand 160 does, however, enter between the lips 96', 97' of the cutter, and is ready to enter slot 98 when the blade 96 moves back. The next moment, the retraction stroke of carrier 38 is completed, and lever 95 is released from follower 140 and spring 99 (Figure 5) retracts blade 96 and opens slot 98 to receive strand 160 (Figures 13 and 13a). Simultaneously roller 69 engages stop 66 and toggle 59 is set, so fixedly clamping the free end for the twist and the twist is commenced, for mutilated gears 115 will already have taken up the 15° lost motion at 131, 132 created by the initial advancement of the gears by cam follower 137 and cam 136 as can be seen from the diagram of Figure 13. Shaft 113 has then rotated 195°.

As the twist progresses, it forces strand 160 deeper and deeper into cutter slot 98, and when it concludes, strand 160 is at full depth in the slot and ready to be cut upon the first advance movement of the carrier 38 and its resultant engagement of follower 140 with cutter lever 95, as shown in the dotted wire lines of Figure 13. The twist is completed and the mutilated gears disengage at 300° rotation of timer shaft (Figure 9) and the advance of carrier 38 to position the free end at B is initiated, the free end being created by the cutting of strand 160 as the movement is initiated. The initial movement presses strand 160 the more firmly in slot 98 for the cut by reason of the slight bending of the strand which the initial movement occasions as can be seen from the diagram Figure 14. The moment the cut is completed, the tie is free to drop to the bale side, for the twister at 300° of rotation of shaft 113 rests with its lay receiving slot 26 presenting downwardly and open to the slot of the bale case. The free end 124 clamped at B is then ready for the impact of the head 150 of the first wad of the new bale, and is soon to be laid in the twister, the first step toward the tying of the new bale.

As organized for this disclosure, the tier achieves a twist of three and one-half turns, for the initial 180° advance of the twister subtracts one-half turn from the total of four turns which the twister takes. Sixty degrees final rotation of the timer shaft is allotted for cutting and re-advance of the carrier 38 to free end rest position B. If desired, these latter can be achieved in but 30° final rotation, so affording 30° additional for twister rotation and making possible one additional turn and a total of four and one-half turns. Obviously, other adjustments of relative movements and rearrangements of the applicable timing diagram can be made to the same, and, yet, other ends. For example, the time of cutting and the preceding depth of the lay for cutting can be adjusted by relative dimensioning and adjustment of the associated cutter blades, levers, cam followers, and carrier operating cams.

The cutter operating mechanism of Hill Serial No. 423,428 can be used in lieu of that just described, if desired, merely by following the teachings of that application, but the combination here described is preferred. This, and, yet, other modifications of my invention, I believe, will fall within its generic spirit and I intend them, and all other generic spirit modifications, to be covered by the annexed claims.

What I claim is:

1. Wire tie mechanism for a baler comprising a wire twister rotatable about a fixed axis and having a radial wire receiving slot opening through its periphery, the twister normally being at rest with the mouth of the slot opening in a predetermined direction, needle means for delivering a loop of wire to a point adjacent one axial end of said twister, a wire carrier reciprocable through a needle stroke and a wire lying stroke past said twister in an axial plane thereof on the radial side of said twister remote from the mouth of said slot when the twister is in its normal position of rest, said carrier placing a free end of wire free of the periphery of said twister whereby said wire is moved into the slot from the opposite side of said twister by means independent of the carrier, and means for rotating said twister a part of a revolution only and bringing it to rest in a new position and simultaneously reciprocating said carrier to cause said carrier to take a loop of wire from said delivery point and bring one side of said loop to the twister and into the slot alongside the previously laid free end while the twister is in its new position of rest.

2. Wire tie mechanism for a baler according to claim 1 in which said means for rotating the twister a part of a revolution is carrier operated.

3. Wire tie mechanism for a baler according to claim 1 in which said means for rotating the twister part of a revolution is carrier operated on the needle stroke of the carrier, and said side of the loop is laid in alongside the previously laid free end on the ensuing strand laying stroke of the carrier.

4. Wire tie mechanism for a baler according to claim 1 in which there is provided additional means for rotating the twister through several revolutions.

5. Wire tie mechanism for a baler according to claim 1 in which there is provided additional means for rotating the twister through several revolutions including a lost motion connection in advance of the twister admitting the initial partial revolution in advance of the additional revolutions.

6. Wire tie mechanism according to claim 1 in which there is provided a main twister drive shaft and said means for rotating the twister part of a revolution comprises an axially extending twister drive cam on a twister drive shaft, and a cam actuating follower is connected to be reciprocated by the carrier.

7. Wire tie mechanism according to claim 1 in which there is provided a main twister drive shaft and said means for rotating the twister part of a revolution comprises an axially extending twister drive cam on a twister drive shaft, and a cam actuating follower is connected to be reciprocated by the carrier together with a free end severing cutter arranged to sever the laid side of the loop between the twister and the carrier, which cutter is also operated by a carrier reciprocated cam follower.

References Cited in the file of this patent

UNITED STATES PATENTS 2,735,359    Tarbox -------------- Feb. 21, 1956